(No Model.)

J. STOCKER.
BELT FASTENER.

No. 506,083.  Patented Oct. 3, 1893.

WITNESSES:

INVENTOR
J. Stocker
BY Munn & Co
ATTORNEYS.

UNITED STATES PATENT OFFICE.

JOHN STOCKER, OF NEW LEWISVILLE, ARKANSAS.

BELT-FASTENER.

SPECIFICATION forming part of Letters Patent No. 506,083, dated October 3, 1893.

Application filed January 4, 1893. Serial No. 457,233. (No model.)

*To all whom it may concern:*

Be it known that I, JOHN STOCKER, of New Lewisville, in the county of Lafayette and State of Arkansas, have invented a new and useful Improvement in Belt-Fasteners, of which the following is a full, clear, and exact description.

This invention relates to hinged wire fasteners for securing the meeting ends of machine or pulley belts and in which the pointed or nose ends of the fastener are secured by clinching.

The invention consists in a novel combination or arrangement of parts in belt fasteners of such or similar description, whereby a cheap and most effective belt fastener is produced, substantially as hereinafter described and more particularly pointed out in the claim.

Reference is to be had to the accompanying drawings forming a part of this specification, in which similar letters of reference indicate corresponding parts in all the figures.

Figure 1:
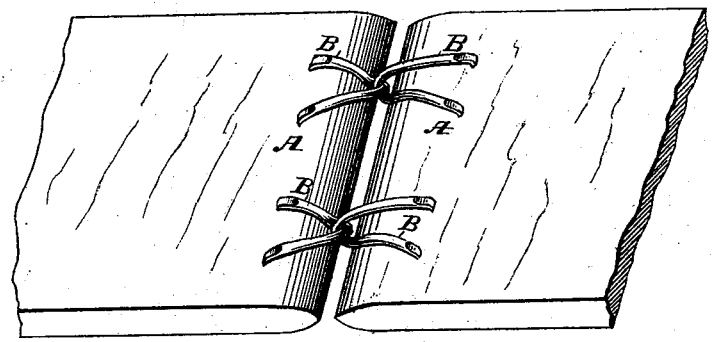
Figure 2:
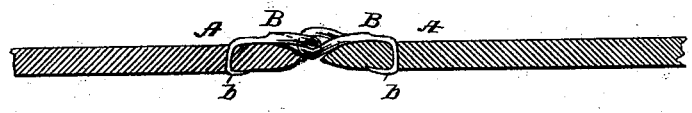
Figure 3:
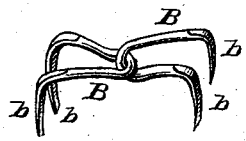

Figure 1 represents a view in perspective of two meeting ends of a belt with two of my improved fasteners applied to connect said belt ends. Fig. 2 is a longitudinal section of the same; and Fig. 3, a perspective view of one of the hinged fasteners constructed in accordance with my invention, detached.

The main objects of the invention are to dispense with all rigidity of the fastening at the meeting ends of the belt, to adapt it to different curvatures of pulleys both in their circumferential and transverse directions, and to provide for the belt working on either or both of its sides or faces around pulleys, without interference or by impairing the secure hold of the fastener, also to provide, in case of breakage of one of the hinging parts of the fastener, for the easy renewal of such broken part without discarding or renewing the whole fastener, and so that the device as an entirety forms a cheap, easily applied and secure means of connecting in a universally hinged manner the meeting ends of the belt, without intervening links or rivets to fasten it to the belt, none of which features, however, are separately claimed.

Each fastener, of which two arranged side by side are shown in Fig. 1 as connecting the meeting ends A A of a belt, but of which there may be any number, that is one or more, is made of two pieces of wire B B, of any suitable metal, each piece of which is bent or doubled over to form an open ended link or half hinge section, which cross or engage in a free jointed or universal manner with one another and have each of their two terminal ends *b b* bent in a right angled direction to form pointed staple-like legs, which in applying the fastener are driven through the belt and afterward clinched on the opposite side thereof, as shown in Fig. 2, the two parts or sections B B of the fastener thus forming staple-like double hooks hinged together and unitedly having four clinching ends or points to unite them with the two meeting ends of the belt and hold the fastener securely in place, yet permitting of the free curvature and movement of the belt in all directions.

Having thus fully described my invention, I claim as new and desire to secure by Letters Patent—

A belt fastener consisting of the two U shape links interlocked at their bends with their legs lying in the same plane and terminating at their extremities in flattened prongs *b b* all projecting at right angles to the plane of the legs in the same direction, substantially as set forth.

JOHN STOCKER.

Witnesses:
J. W. COX,
T. A. JOYNER.